(12) United States Patent
Murata et al.

(10) Patent No.: US 7,278,573 B2
(45) Date of Patent: Oct. 9, 2007

(54) DEVICE FOR READING OPTICAL CODE

(75) Inventors: Takuya Murata, Fukuchiyama (JP);
Katsuki Nakajima, Fukuchiyama (JP);
Gaku Shiramizu, Ayabe (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 11/449,422

(22) Filed: Jun. 7, 2006

(65) Prior Publication Data

US 2006/0226227 A1   Oct. 12, 2006

Related U.S. Application Data

(62) Division of application No. 10/731,675, filed on Dec. 8, 2003, now Pat. No. 7,100,830.

(30) Foreign Application Priority Data

Dec. 10, 2002 (JP) ............... 2002-358330
Nov. 11, 2003 (JP) ............... 2003-381375

(51) Int. Cl.
*G06K 7/10* (2006.01)
*G06K 7/14* (2006.01)
*G06K 15/12* (2006.01)
*G06K 9/22* (2006.01)
*G06K 19/06* (2006.01)
*G02B 26/10* (2006.01)

(52) U.S. Cl. ............. 235/454; 235/462.41; 235/462.25

(58) Field of Classification Search ........... 235/462.41, 235/462.42, 462.22, 462.23, 462.24, 462.25, 235/455
See application file for complete search history.

(56) References Cited

U.S. PATENT DOCUMENTS

| | | | |
|---|---|---|---|
| 5,468,950 A | 11/1995 | Hanson | |
| 5,572,006 A | 11/1996 | Wang et al. | |
| 5,597,997 A | 1/1997 | Obata et al. | |
| 5,717,195 A | 2/1998 | Feng et al. | |
| 5,811,774 A | 9/1998 | Ju et al. | |
| 6,010,070 A | 1/2000 | Mizuochi et al. | |
| 6,053,408 A | 4/2000 | Stoner | |
| 6,318,637 B1 | 11/2001 | Stoner | |
| 6,598,797 B2 | 7/2003 | Lee | |
| 6,616,039 B1 | 9/2003 | Saporetti et al. | |
| 6,860,428 B1 | 3/2005 | Dowling et al. | |
| 7,118,042 B2 * | 10/2006 | Moore et al. ........ | 235/462.42 |

* cited by examiner

*Primary Examiner*—Jared J. Fureman
(74) *Attorney, Agent, or Firm*—Beyer Weaver LLP

(57) ABSTRACT

A device for reading out an optical code includes a camera, an image memory for storing images taken by this camera, and an image processor for decoding an optical code contained in an image taken by the camera. A plurality of images are obtained continuously with the camera under specified image-taking conditions in response to a specified image-taking command, and the obtained images are stored on the image memory. The images stored in the image memory are sequentially selected one at a time in a specified order, and the image processor makes an attempt to decode an optical code contained in the selected image. Results of decoding are outputted if the attempt to decode any of the stored images is successful. The interval at which the images are taken is changed according to the number of images successfully decoded taken continuously in the past.

1 Claim, 15 Drawing Sheets

| | RESULT OF PAST READOUT | | | | | | | | | TOTAL SUCCESS |
|---|---|---|---|---|---|---|---|---|---|---|
| | 100TH | 99TH | 98TH | 97TH | 96TH | 95TH | 94TH | 93RD | ... | 1ST | |
| 1 | | | | | | | | | | | 0 |
| 2 | | | | | | | | | | | 0 |
| 3 | | | FAILURE | SUCCESS | | | | | | | 1 |
| 4 | FAILURE | FAILURE | SUCCESS | | | | SUCCESS | | | | 9 |
| 5 | SUCCESS | SUCCESS | | | SUCCESS | | | SUCCESS | | SUCCESS | 85 |
| 6 | | | | | | SUCCESS | | | | | 5 |
| 7 | | | | | | | | | | | 0 |

FIG. 13

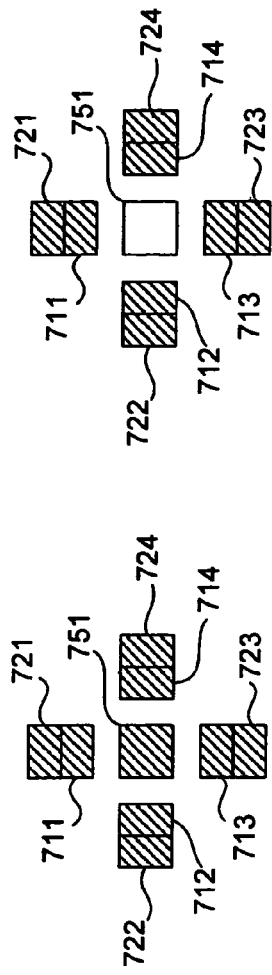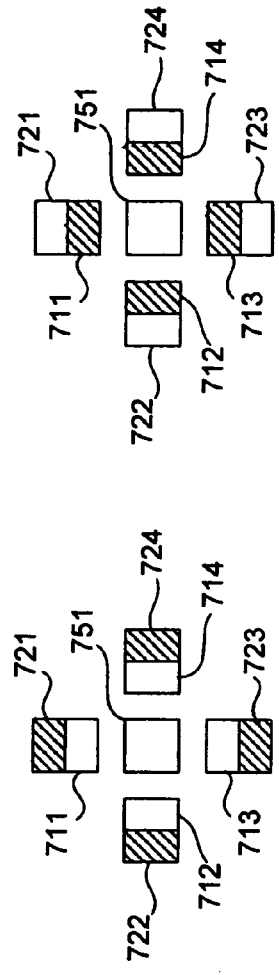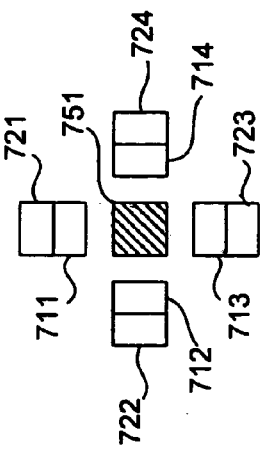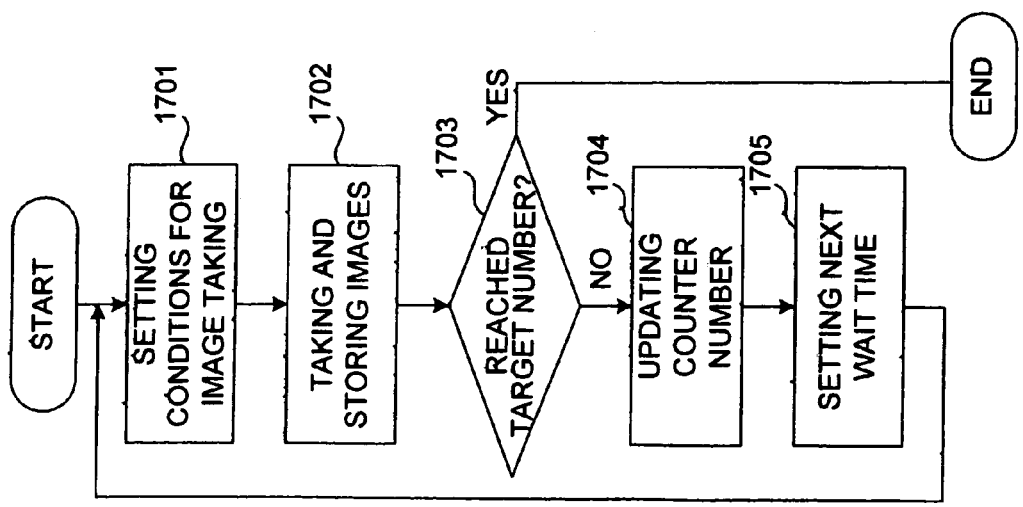

DEVICE FOR READING OPTICAL CODE

This is a divisional of application Ser. No. 10/731,675 filed Dec. 8, 2003, now U.S. Pat. No. 7,100,830.

BACKGROUND OF THE INVENTION

This invention relates to a device for reading an optical code such as a bar code and a two-dimensional code.

For using a camera containing an image sensor and set above a supply line to read out a very small optical code affixed to a work being transported thereon, various ideas have been developed for setting the timing for taking in an image. Japanese Patent Publication Tokkai 2000-293616, for example, disclosed a data code reader adapted to repeatedly take in images by means of a CCD camera at suitable time intervals after power is switched on and to switch to a decoding process based on the newest of the images already taken and stored in a memory device immediately after a trigger input is received.

According to this prior art technology, the timing for taking in images is completely asynchronous to the timing of the trigger input. Thus, there may be situations wherein the target optical code may not be in the image that has been obtained even if the trigger is generated as a trigger sensor (such as a fiber-type photoelectric sensor) detects the arrival of the position of a code on a work into the field of vision of the camera. There are situations where there are variations in the positioning of optical codes on a work. FIG. 19 shows an example wherein a two-dimensional optical code 8 is displaced from its intended position by $\Delta L$. Thus, situations wherein the target optical code is not present in the field of vision of the camera or not completely present are not avoidable.

SUMMARY OF THE INVENTION

It is therefore an object of this invention, in view of the above, to provide a device for dependably reading an optical code, say, attached to a work.

It is another object of this invention to provide a device for reading an optical code with an improved probability of success and as quickly as possible.

Other objects and effects of the present invention will become clear to a person skilled in the art from the description of the invention given below.

A device according to a second embodiment of the invention may be characterized as comprising a camera containing an image sensor, an image memory for storing images taken by the camera, an image processor for decoding an optical code contained in an image taken by the camera, image-taking means for obtaining a plurality of images continuously with the camera under specified image-taking conditions in response to a specified image-taking command and causing the obtained images to be stored on an image memory, image-decoding means for sequentially selecting one of the images stored on the image memory in a specified order, causing the image processor to make an attempt to decode an optical code contained in the selected image and outputting results of decoding as successful decoding if the attempt to decode at least one of the stored images is successful, and interval-changing means for changing interval at which the plurality of images are to be taken by the image-taking means according to the number of successfully decoded ones of the plurality of images taken continuously in the past.

Although it is sufficient for the purpose of reading an optical code if at least one of the images taken continuously with the camera, there may be situations where the optical code is contained in two or more of the images or in none of them, depending on the relationship between the speed at which the code-carrying work is traveling and the intervals at which the plurality of images are taken. If the target code to be read out is contained in two many of the images, an image memory with an accordingly larger capacity will be required and this affects the production cost of the device adversely. If the device is set such that only one of the images is likely to contain the optical code, on the other hand, even a slight deviation in the timing or a small variation in the aforementioned relationship is likely to cause the optical code not to appear in any of the obtained images. For this reason, it is desirable to aim to cause two of the images to contain the optical code by correcting the wait time of the image-taking, or the intervals at which the plurality of images are obtained, such that the probability of successful decoding is maintained without increasing the capacity of the memory device unreasonably.

In this regard, it is preferable that the aforementioned interval-changing means be adapted to change the intervals according to a specified interval because the user can freely adjust the interval by specifying a preferred value. It is also preferable that the interval-changing means be adapted to change the intervals according to the number of images taken continuously by the image-taking means while keeping constant the total time taken for taking the plurality of images continuously by the image-taking means because the user may be allowed to simply specify the number of images to be taken after fixing the total time allowed for the taking of the plurality of images continuously since the corresponding interval can be calculated automatically from the specified number of images to be taken.

Another device according to a third embodiment of the invention may be characterized as comprising a camera containing an image sensor and having a variable shutter speed, an illuminator for illuminating a target object under variable lighting conditions, an image memory for storing images taken by the camera, an image processor for decoding an optical code contained in an image taken by the camera, image-taking means for obtaining a plurality of images continuously with the camera under specified image-taking conditions in response to a specified image-taking command and causing the obtained images to be stored on an image memory, the image-taking conditions being defined by at least one selected from the group consisting of the shutter speed of the camera and the lighting conditions of the illuminator, and image-decoding means for sequentially selecting one of the images stored on the image memory in a specified order, causing the image processor to make an attempt to decode an optical code contained in the selected image, and outputting results of decoding as successful decoding, if the attempt to decode at least one of the stored images is successful.

According to the present invention, even after a decoding attempt on one of the images turns out to be successful, it is not required that this should be outputted immediately to any external system and it is allowed to determine whether or not the remaining images can be successfully decoded. According to this embodiment of the invention, the probability of finding the optical code in the obtained images is high and the decoding is likely to succeed even in the presence of variations in the timing of the trigger input or the arrival of the work or in the position of the optical code on the work. Moreover, since the success and failure on the remaining images can be ascertained, the image-taking conditions can be appropriately set by using such information.

It may be preferable to vary the image-taking conditions while the plurality of images are taken continuously. In this manner, a plurality of images taken under different conditions are obtained and hence the probability of successful decoding may be increased in spite of possible changes in the surface condition of the work or the optical code because attempts at decoding are made on a plurality of images with different image qualities. Where works of a same kind are being transported, many images are taken of each work under different conditions and hence at least one of the images on each work is likely to be taken under optimum or nearly optimum conditions. Even where works with different kinds are mixed, the probability of successful decoding improves by the present invention because at least one of the plurality of images is likely to have been taken under nearly optimum conditions. In other words, the user is not required to correct the image-taking conditions each time a work with different surface conditions is introduced.

It is also preferable to compare quality of images that were successfully decoded earlier and to determine "optimum conditions" from such a comparison. In this case, the image quality may include contrast, or the difference between a maximum or average white pixel level and a minimum or average black pixel level in the background area or the optical code area in the image. By this method, the image-taking conditions converge to optimum conditions as images are repeatedly being taken and hence the probability of decoding successfully improves as the process progresses.

In summary, the present invention improves the probability of having at least one of the sequentially taken images to contain the optical code even in the presence of variations in the timing between the trigger input and the arrival of the work or variations in optical conditions on the works, and hence that the probability of successfully reading the optical code is improved.

BRIEF DESCRIPTION OF THE DRAWINGS

FIG. 13 is an example of table for showing the results of past readout processes.

FIG. 17 is a flowchart of the process for continuously taking a specified plural number of images while changing conditions each time.

FIGS. 18A, 18B, 18C, 18D and 18E, together referred to as FIG. 18, are drawings of different illumination patterns of the illuminator.

DETAILED DESCRIPTION OF THE INVENTION

The invention is described next by way of examples with reference to drawings but it goes without saying that these examples show only a few of many ways in which the present invention can be manifested and hence are not intended to limit the scope of the invention.

Figure 1:
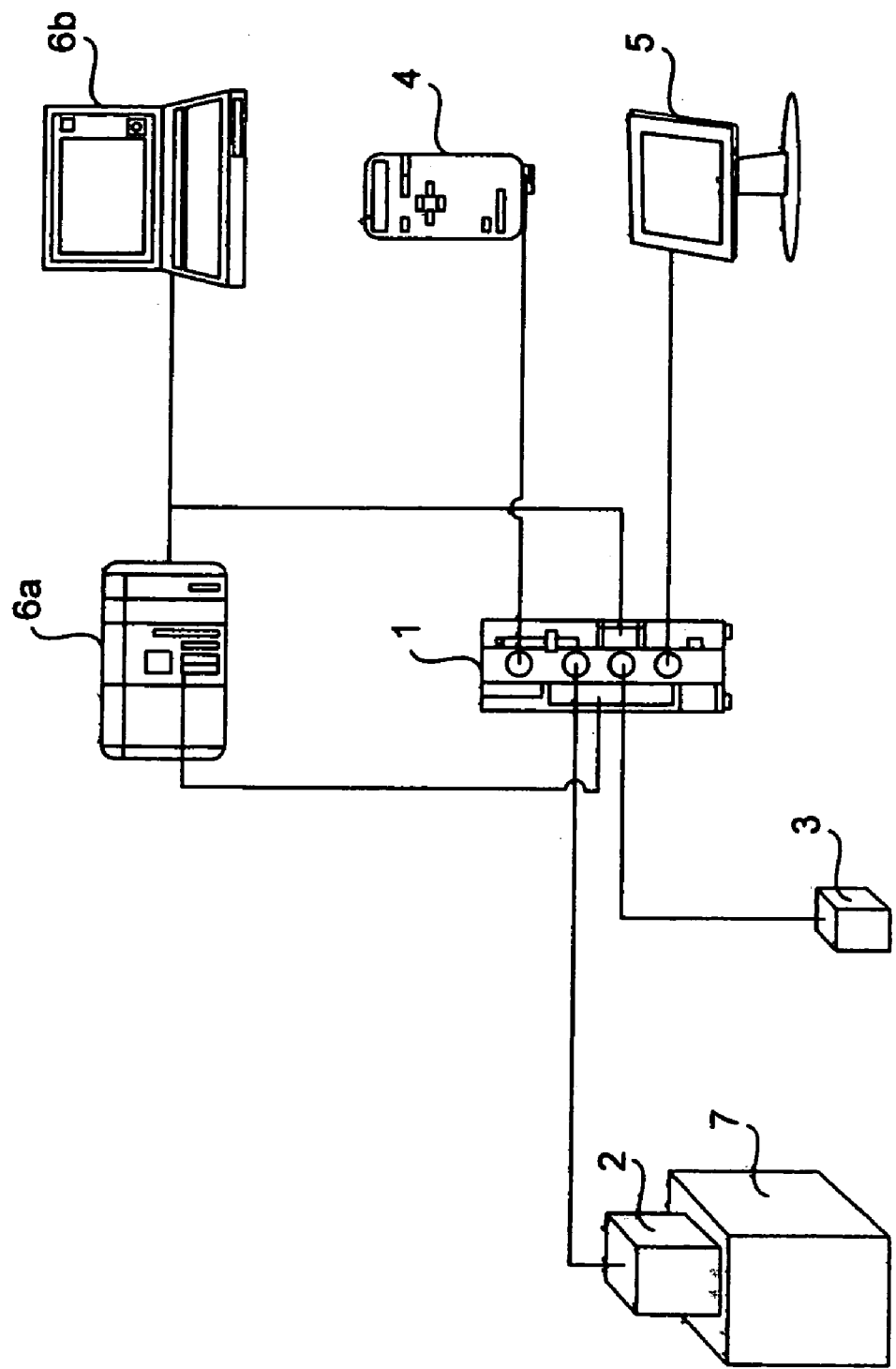
FIG. 1 is a schematic external view for showing the system structure of this invention.

FIG. 1 is a schematic external view for showing the system structure of a device embodying this invention, including a controller 1, a camera 2, a trigger timing detection sensor 3, a consol 4, a video monitor 5, a programmable controller 6a, a personal computer 6b and an illuminator 7 provided with a hood.

The camera 2 contains therein an image sensor such as a CCD and the illuminator 7 is provided at its front end. The illuminator 7 is provided with a plurality of illuminator elements at different illumination angles. The illuminator elements are each comprised of one or more light sources and may be switched on (lit) individually or in combinations, that is, two or more of the illuminator elements may be switched on simultaneously under the control of the controller 1.

The trigger timing detection sensor 3 is for detecting the timing of the arrival of a work traveling along a path of transportation into the field of vision of the camera 2 and thereby generating a trigger input. The consol 4 and the video monitor 5 are for functioning as a human-machine interface for the device of this invention. The device and its operator converse with each other through this interface. The programmable controller 6a and the personal computer 6b serve as a host system for the device of this invention. The programmable controller 6a may be used, for example, for controlling a production line as a whole, and the personal computer 6b may be used for providing various general commands to the programmable controller 6a.

Figure 2:
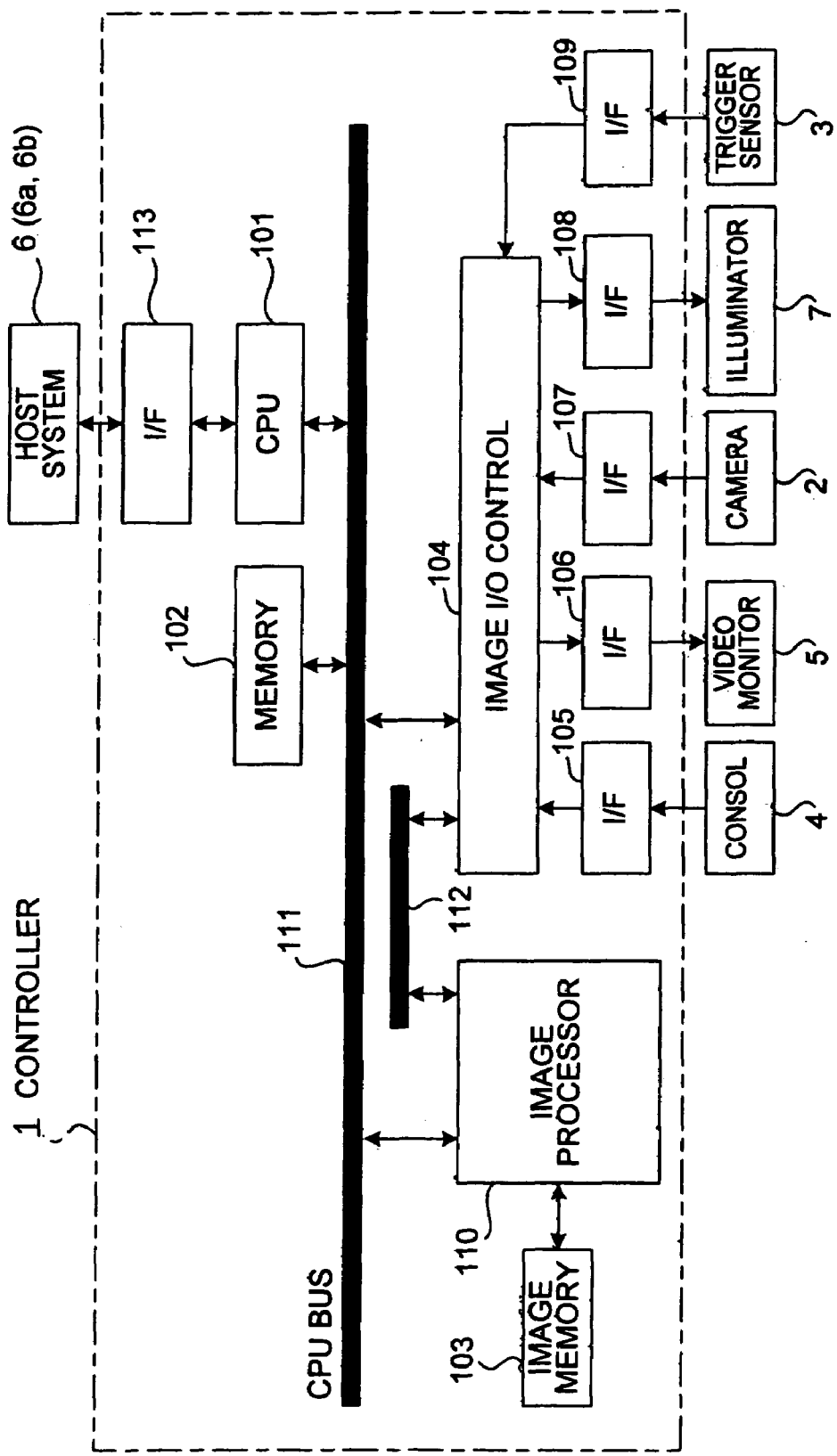
FIG. 2 is a block diagram for showing the internal structure of the controller.

As shown in FIG. 2, the controller 1 includes a CPU 101, a (general) memory 102, an image memory 103, an image input-output control unit 104, a consol interface 105, a monitor interface 106, a camera interface 107, an illuminator interface 108, a trigger sensor interface 109, an image processor 110, a CPU bus 111, an internal bus 112 and a communication interface 113. The CPU 101 is comprised mainly of a microprocessor and controls the controller 1 as a whole by carrying out a system program stored in the memory 102.

The controller 1 is connected not only to a host system 6 (that is, the programmable controller 6a and the personal computer 6b) through the communication interface 113 but also to the consol 4, the video monitor 5, the camera 2, the illuminator 7 and the trigger sensor 3 respectively through the consol interface 105, the monitor interface 106, the camera interface 107, the illuminator interface 108 and the trigger sensor interface 109.

The trigger input that is generated by the operation of the trigger sensor 3 is received by the controller 1 through the trigger sensor interface 109. The illuminator elements that comprise the illuminator 7 are selectively lit by signals received from the controller 1 through the illuminator interface 108, thereby bringing about various modes of illumination. Images obtained by the camera 2 are received by the controller 1 through the camera interface 107 and are eventually stored in the image memory 103. Image data thus stored in the image memory 103 are appropriately read out and given to the image processor 110 by which various image processing operations of known kinds are carried out and a decoding process is carried out according to a specified rule. Commands of various kinds generated by the consol 4 in response to operations by the operator are received by the controller 1 through the consol interface 105. Instructions of various kinds from the controller 1 to the operator are transmitted to the video monitor 5 through the monitor interface 5, and characters and figures corresponding to data are displayed on the screen of the video monitor 5. High-speed internal transfers of image data are carried out through the internal bus 112. Data of various kinds handled by the CPU 101 are transmitted to corresponding circuits through the CPU bus 111.

Figure 3:
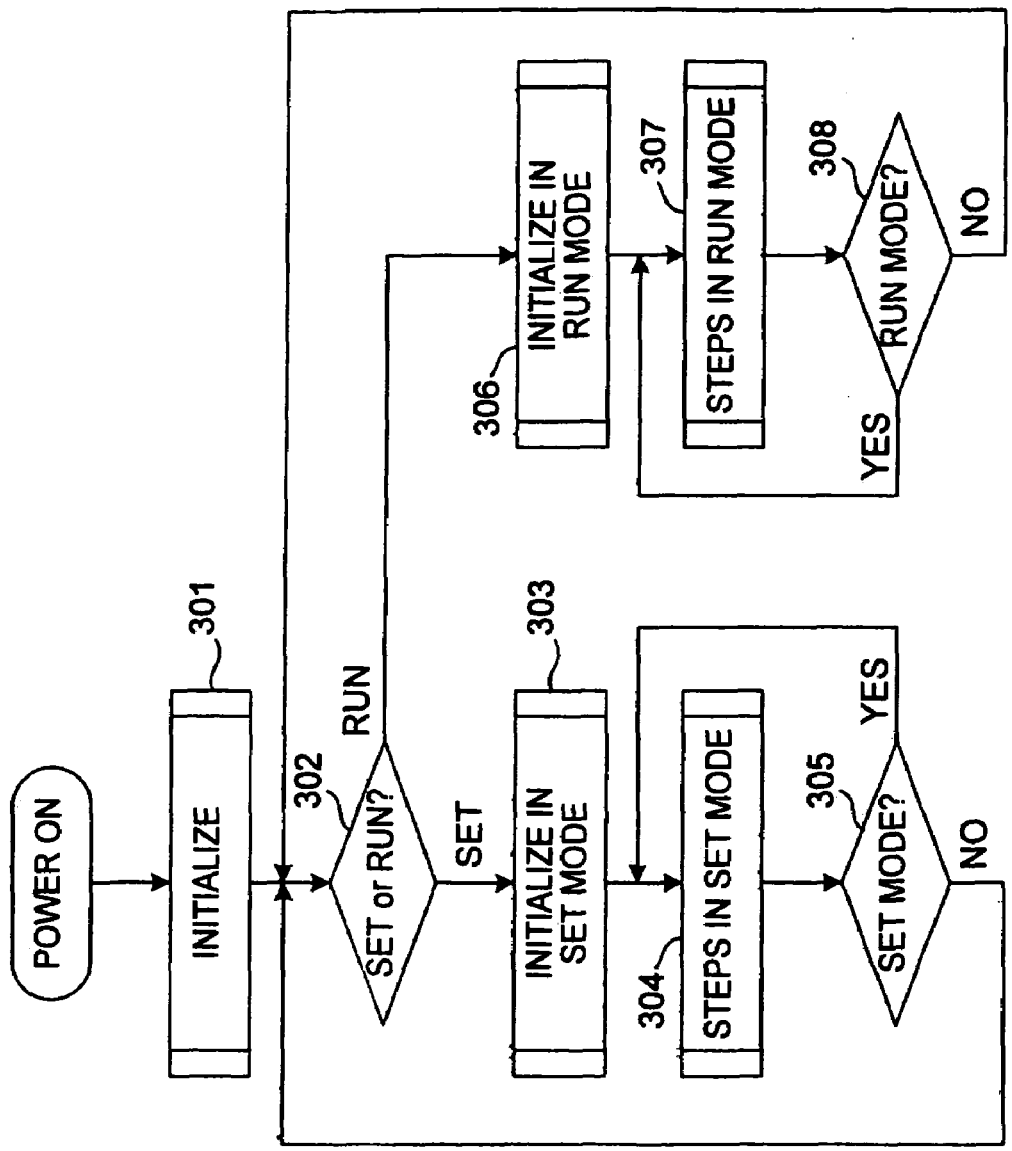
FIG. 3 is a flowchart for schematically showing the general processing carried out by the CPU.

The overall process carried out by the CPU 101 is explained next with reference to the schematic flowchart shown in FIG. 3. As power is switched on and the process is started, a general initialization process is carried out (Step 301) and thereafter either the steps (Steps 303, 304 and 305) of the SET mode or those (Steps S306, 307 and 308) of the RUN mode are selectively carried out, depending on how a SET/RUN selection switch (not shown) of the controller 1 is set by the user.

When two-dimensional codes are to be read out from works being transported along a line of transportation, the steps of the Run mode are carried out (Step 307). Setting and teaching steps of various kinds prior to the RUN mode operations are carried out in the SET mode (Step 304).

Figure 4:
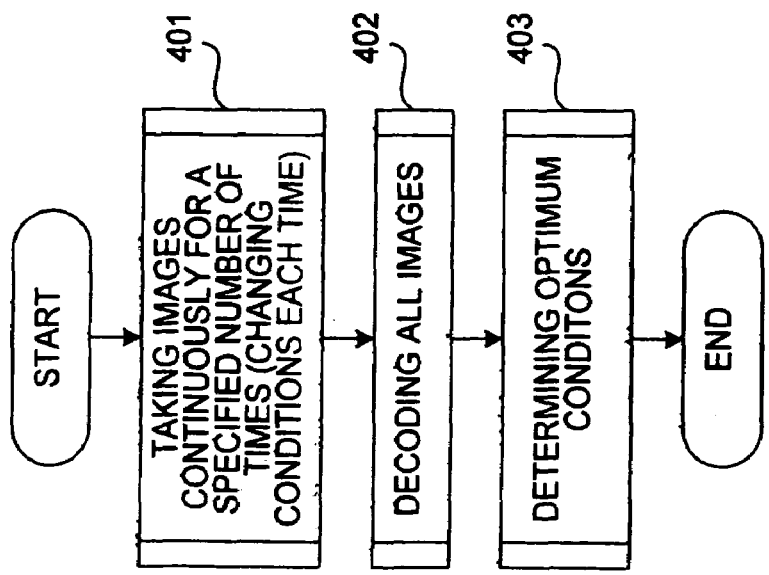
FIG. 4 is a general flowchart of the process for automatically setting conditions for image-taking.

FIG. 4 is a general flowchart for the routine (process) to be carried out in the SET mode for automatically setting conditions for image-taking (or the "image-taking conditions"). As shown, this routine includes a process of continuously taking images for a specified number of times by changing image-taking conditions each time (Step 401), that of decoding all images (Step 302) and that of determining optimum conditions (Step 403). This routine for automatically setting image-taking conditions is started when a signal for starting the teaching routine is received from the communication interface 113 or the consol interface 105.

Figure 5:
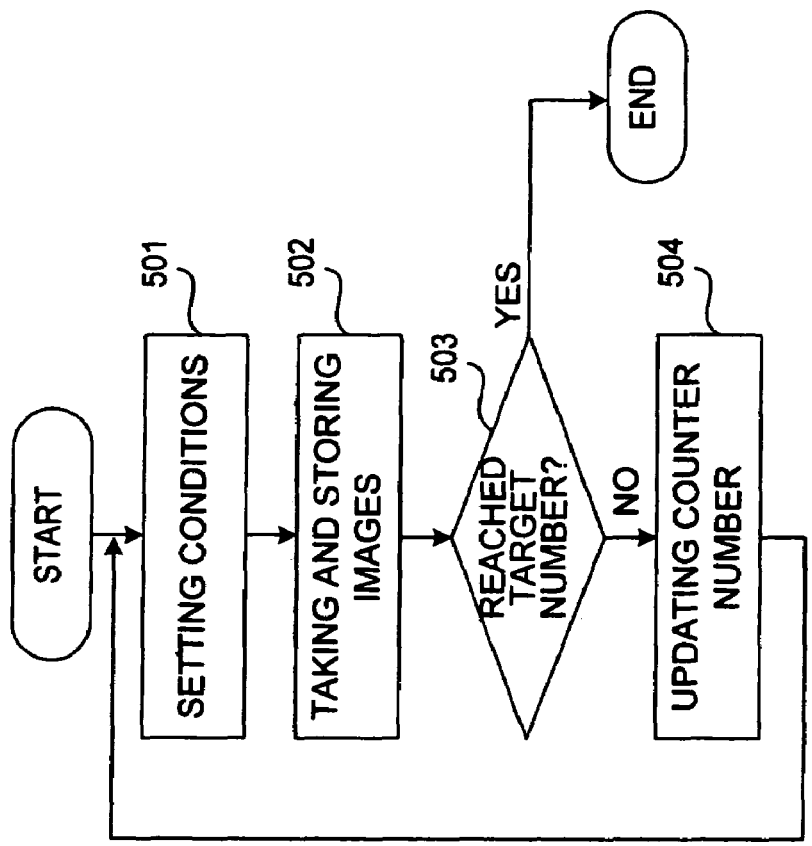
FIG. 5 is a flowchart of the process shown in FIG. 4 of continuous image-taking by changing conditions each time.

FIG. 5 is a flowchart for showing in detail the process of taking images continuously by changing conditions each time. Firstly, as shown in FIG. 5, conditions for taking images are set (Step 501), and an illumination mode and a shutter speed are set for each image that is taken. Corresponding control data are transmitted to the camera 2 and the illuminator 7. A shutter speed for the camera 2 (or more generally the shutter speed of an electronic shutter by a CCD element) is set and the lighting conditions of the illuminator 7 (selective lighting of illuminator elements) are also set simultaneously. Next, an image is taken (Step 502) under the set conditions (such as the shutter speed and the lighting condition) by the camera 3. The image data thus obtained by the camera 3 are stored at a memory area corresponding to the number of times the image-taking process has been carried out.

Next, it is determined whether a preliminarily specified target number of images have been continuously taken (Step 503). If this image-taking process is found not to have been repeated by this target number of times (NO in Step 503), a counter number for this purpose is updated by adding +1 (Step 504), and Steps 501 and 502 are repeated to take another image under different image-taking and lighting conditions from the previous cycle. Thereafter, Steps 501 and 502 are repeated until the specified target number of cycles has been reached (YES in Step 503). Aforementioned Step 401 is completed if the counter number is found to have reached the specified target number (YES in Step 503).

As the process of FIG. 5 (or Step 401) is completed, as many memory areas in the image memory 103 as the specified target number now contain image data each taken under a different lighting condition and with a different shutter speed. In other words, a plurality of images taken under different conditions are now available.

Figure 6:
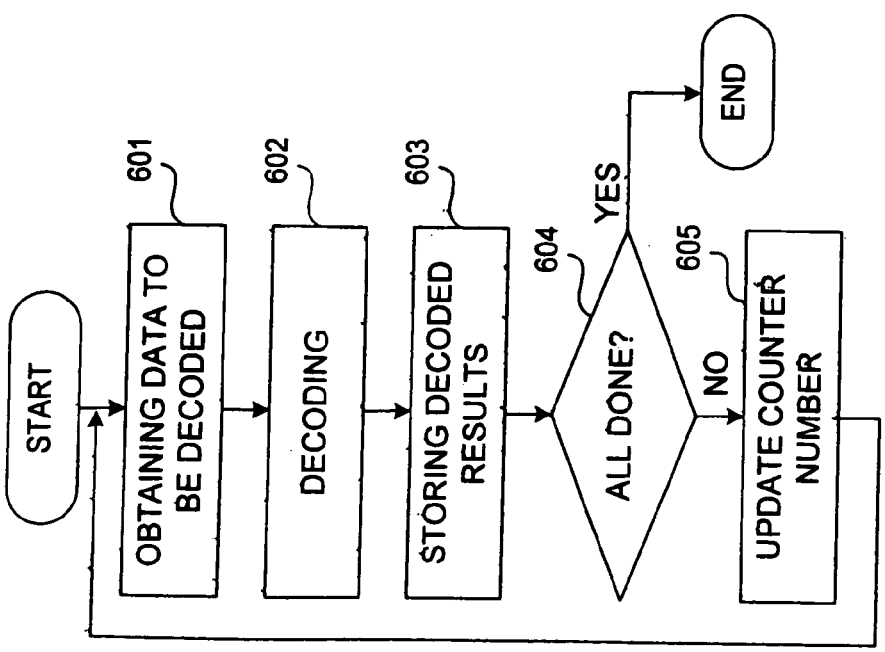
FIG. 6 is a flowchart of the decoding process shown in FIG. 4.

The decoding process (Step 402) shown in FIG. 4 is described more in detail next with reference to the flowchart of FIG. 6. In this process, image data are first obtained from the corresponding area of the image memory 103 (Step 601) and then a decoding process is carried out to read out a two-dimensional code (Step 602). Details of this process are shown in the flowchart of FIG. 8.

Figure 8:
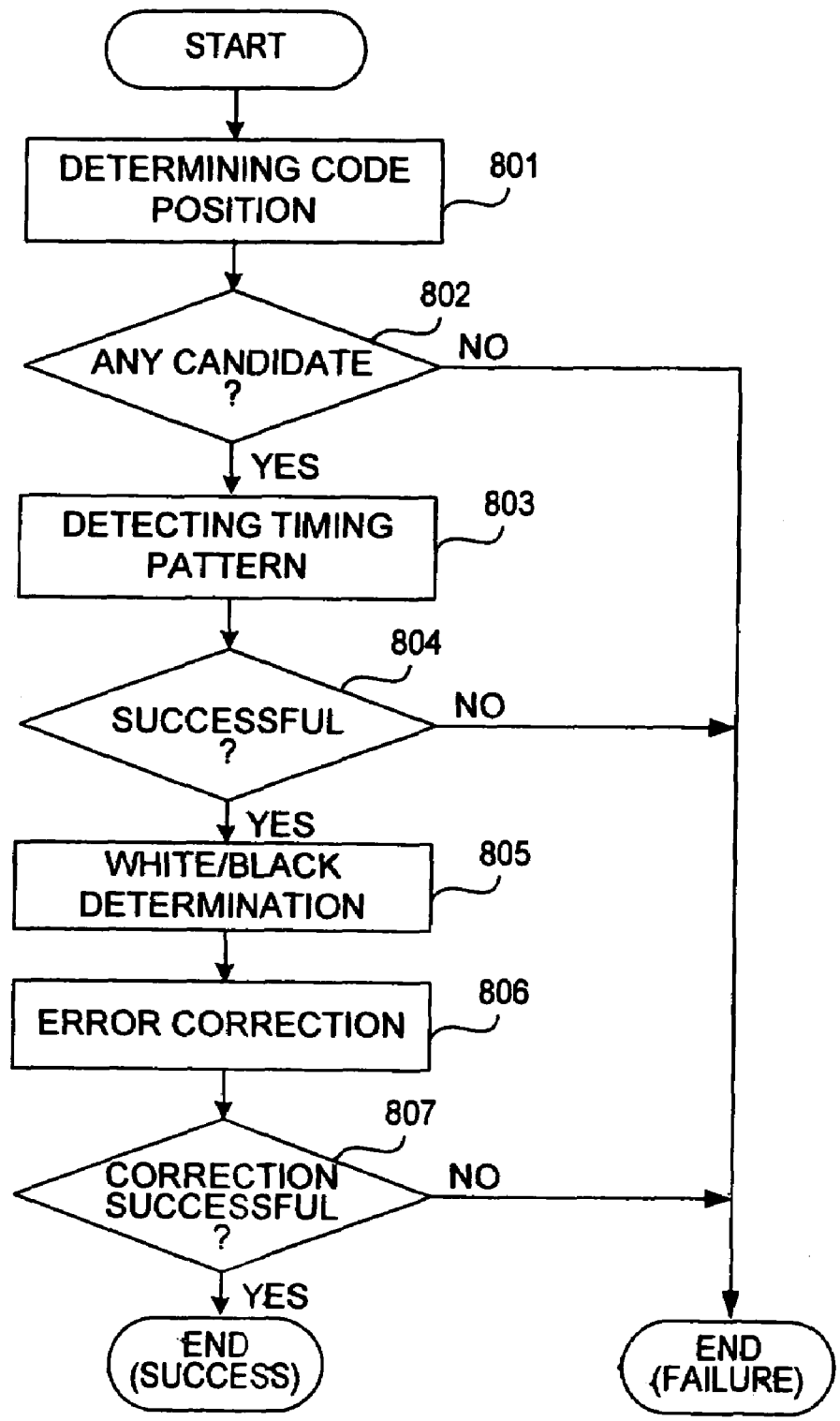
FIG. 8 is a flowchart showing the details of the decoding process.

As shown in FIG. 8, the position of the code for each image is initially determined (Step 801) by searching for a special shape pattern (commonly referred to as "finder pattern") intended to indicate the position of a two-dimensional code. Next, it is determined whether or not there is any pattern ("candidate") that may indicate the presence of a code in the image (Step 802). If no candidate is found (NO in Step 802), it is concluded that the decoding process failed. If a candidate is detected (YES in Step 802), a so-called timing pattern serving to determine positions of pixels (or image cells) is identified and coordinates of the cells of the pattern are obtained (Step 803). Next, it is determined whether the detection of a timing pattern has been successful (Step 804), and if it turns out not to be successful (NO in Step 804), it is also concluded that the decoding process failed. If it is determined that the detection of a timing pattern was successful (YES in Step 804), each of the cells is identified to be either white or black (Step 805). This process is carried out by referring to the coordinates of the cells obtained earlier when the timing pattern was detected.

Next, an error correction routine of a known kind is carried out (Step 806). If the error correction is thereafter determined not to have been successful (NO in Step 807), it is determined that the decoding failed. If it is determined that the error correction has been successful (YES in Step 807), it is determined that the decoding has been successful. This is how Step 602 of FIG. 6 is carried out. The decoding process explained above with reference to FIG. 8 may be carried out not only in the SET mode but also in the RUN mode.

In Step 603 of FIG. 6, the decoded results of Step 602 are individually stored, that is, data such as whether the decoding was successful or not, the image-taking conditions and stability of successful decoding are stored individually for each image. In the above, stability means an index for showing how stably accurate information could be obtained from the decoded image. If errors had to be corrected at many places in the error correcting process described above, the image is judged to be of low stability. If errors were corrected only at a few places, on the other hand, the image is considered to be of high stability. Many different methods are available for measuring stability. One simple method is to judge the level of stability on the basis of the contrast of the image. It may be explained that the quality of the image in a broad sense of the expression corresponds to the level of stability.

Next, it is examined whether or not the processing described above has been completed on all of the images that were taken (Step 604). If the processing has not been completed (NO in Step 604), a counter value is updated by adding +1 (Step 605) and Steps 601, 602 and 603 are repeated. If all images have been processed (YES in Step 604), the decoding process is concluded.

Figure 7:
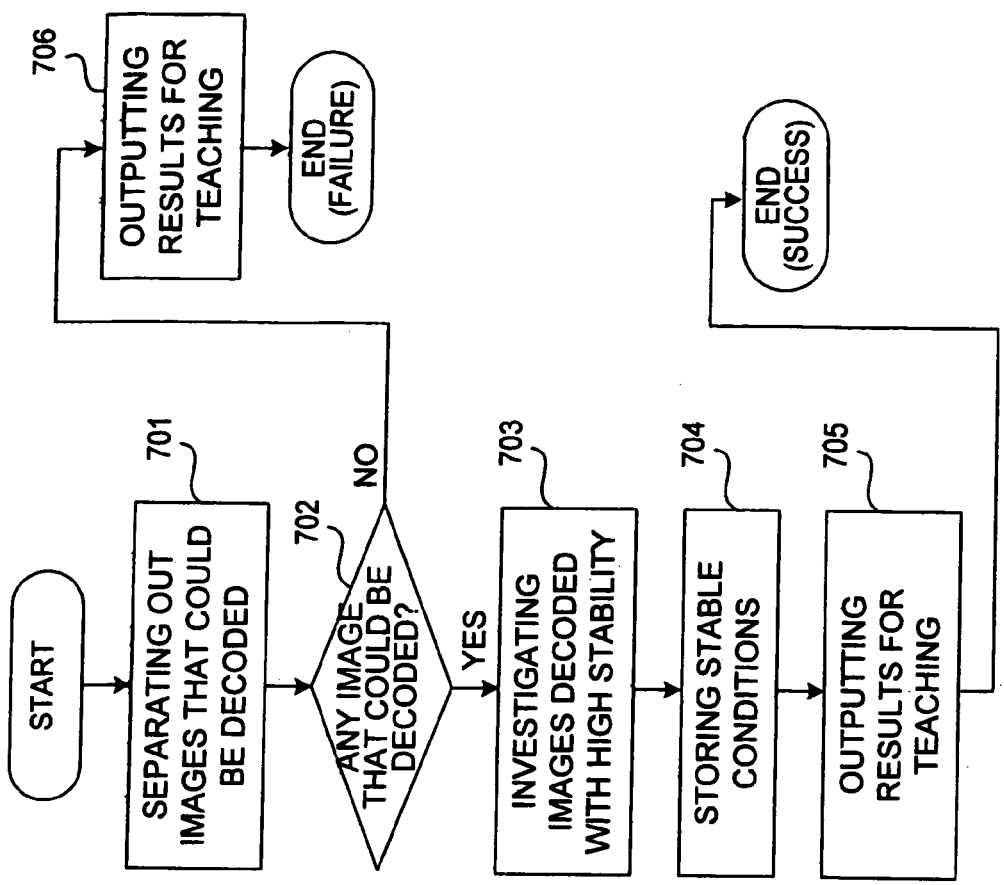
FIG. 7 is a flowchart showing the details of the process for determining optical conditions.

The process of determining an optimum condition (Step 403) is explained next more in detail with reference to the flowchart of FIG. 7. In this process, images that could be decoded are separated out (Step 701), and the data on the results of the decoding process (such as success or failure of decoding, stability and conditions on taking image) stored in Step 603) are compared among themselves to ascertain under what image-taking conditions they could be read out.

It is checked next whether or not there was at least one image that could be decoded (Step 702). If there was no image that could be decoded (NO in Step 702), this result is communicated to the user through the video monitor 5 (Step 706). If it is determined that there was at least one decodable image (YES in Step 702), decoded images with a high level of stability are investigated (Step 703) and the image-taking conditions of the decodable images are stored (as teaching material) in the order of stability (Step 704). The results of teaching thus obtained are thereafter outputted, and the success in teaching is reported to the user through the video monitor 5 (Step 705).

Figure 9:
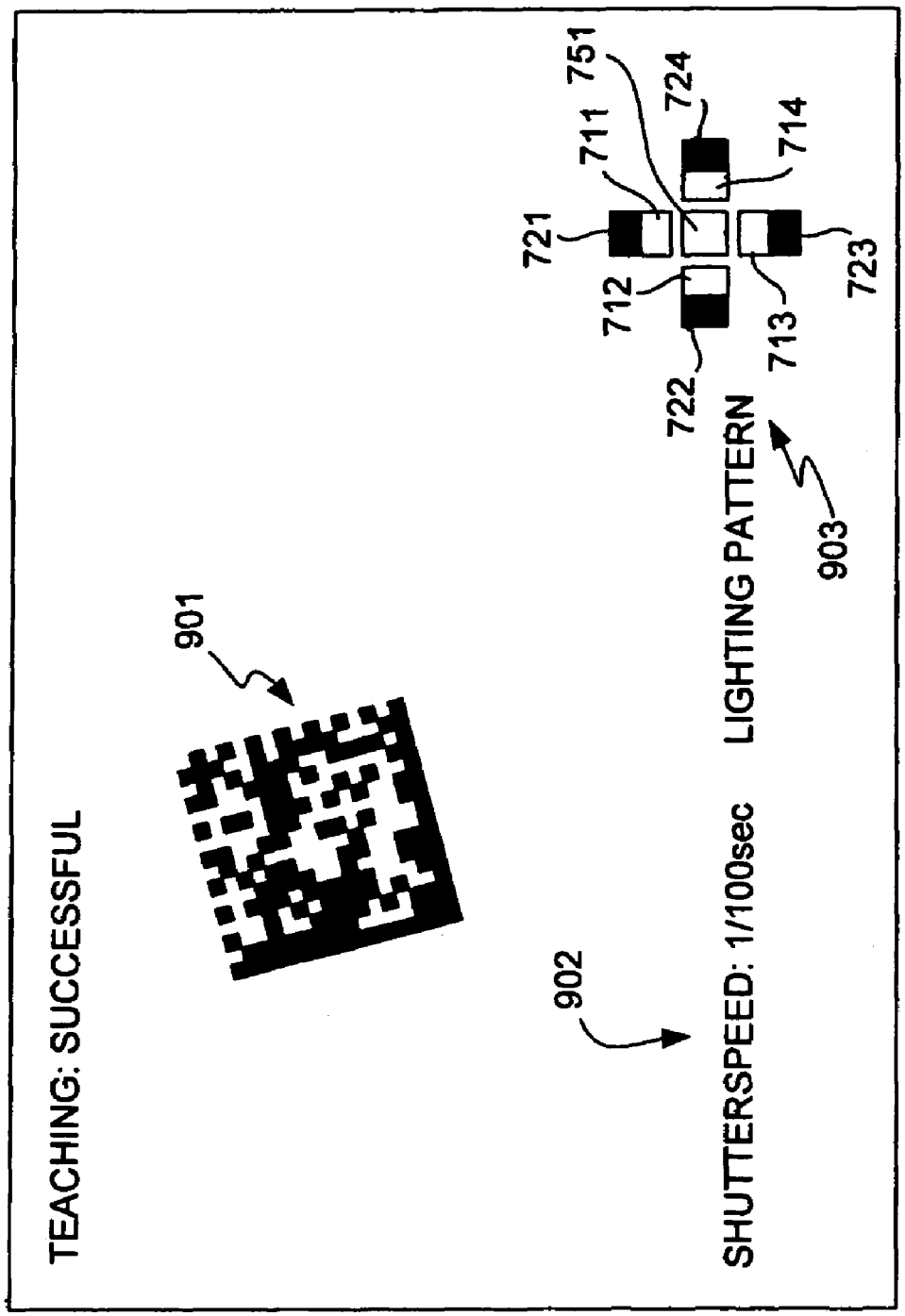
FIG. 9 is an example of monitor display at the time of a successful end of teaching.

FIG. 9 shows an example of monitor display at the time of successful teaching. In this example, an image 901 of the decoded two-dimensional code related to successful teaching is displayed at the center of the monitor screen at the same angle as read out by the decoding process. A shutter speed display 902 showing, for example, that the shutter speed was 1/100 second also appears on the screen. A lighting pattern display 903 is made by way of symbols 751, 711-714 and 721-724 for individual illuminator elements. Symbol 751 indicates the illuminator element directly above, symbols 711-714 indicate the four inner illuminator elements and symbols 721-724 indicate the four outer illuminator elements surrounding them. The display of FIG. 9 indicates that a successful decoding resulted with the illumination pattern with only the four outer illuminator elements being lit. In addition to the image 901 of the two-dimensional code that has been read out, any other additional data may be displayed such as other image-taking conditions and data related to the two-dimensional code such as its cell size.

Figure 10:
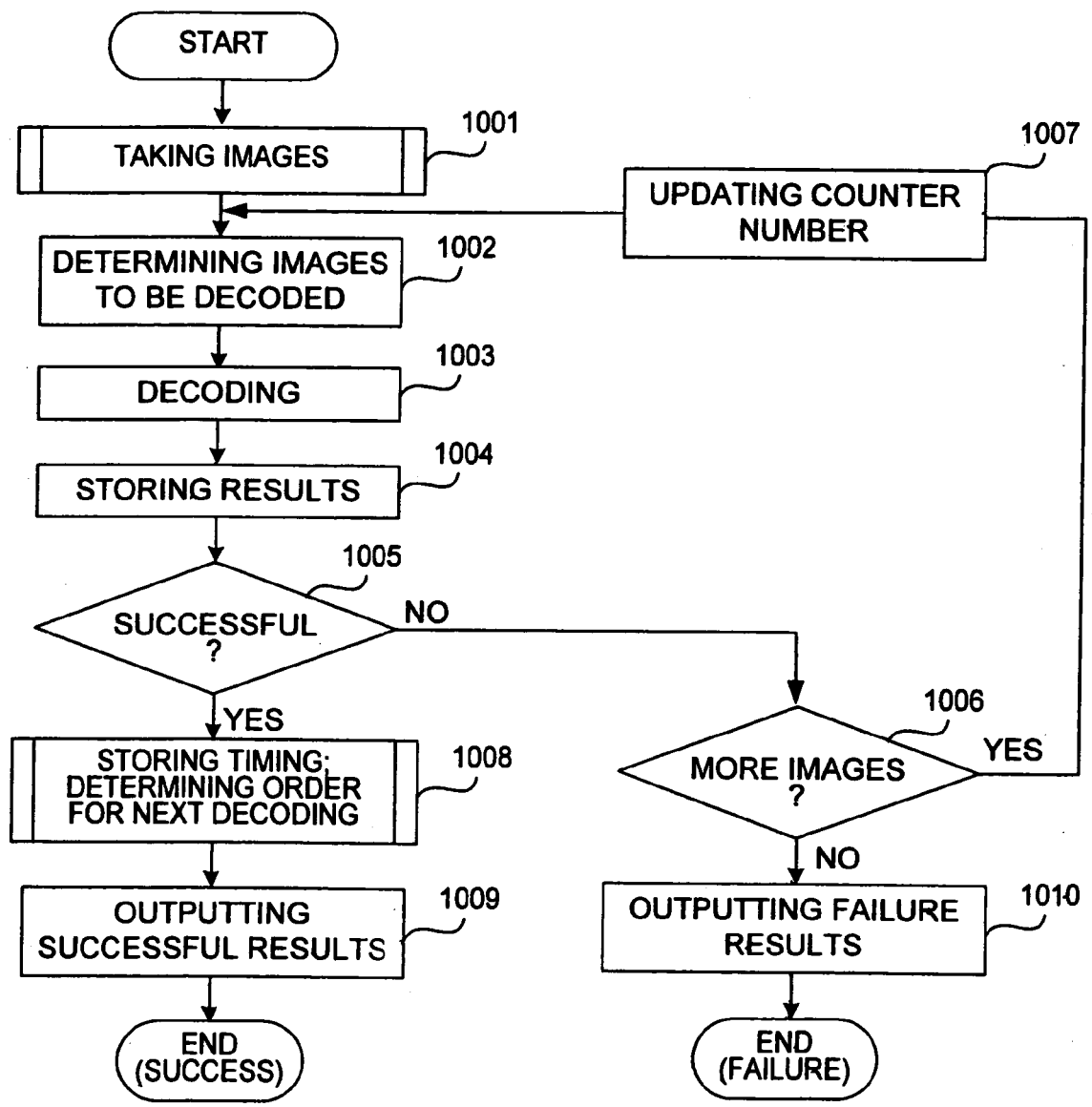
FIG. 10 is a flowchart of the entire process for reading two-dimensional codes (by automatically correcting the order of decoding).

FIG. 10 shows a flowchart of the process in its entirety for automatically correcting the order of decoding in reading out two-dimensional codes. This is one of the processes that may be carried out in the RUN mode and is started after waiting for the arrival of a trigger input. The trigger input is generated when the trigger timing detection sensor 3 detects the arrival of a work, when a command to start image-taking is operated at the consol 4, or when a start command for image-taking sent from the host system 6 has been received.

Figure 11:
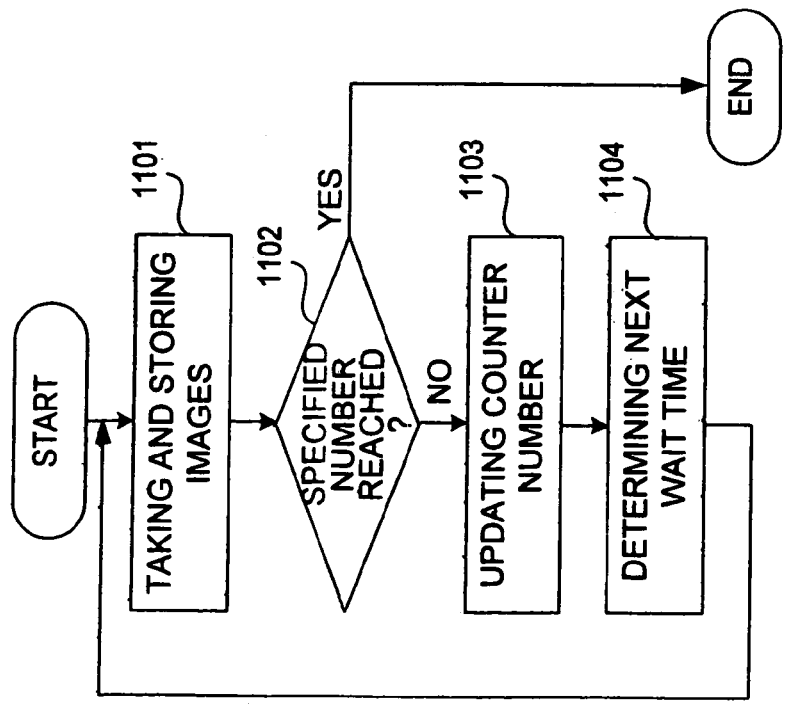
FIG. 11 is a flowchart showing the details of the process of repeatedly taking images.

After this process is started in response to a trigger input, a specified number of images are repeatedly taken (Step 1001). This is done, as shown in detail in FIG. 11, by increasing a counter number representing the number of images that have been taken by +1 each time (Step 1103) after taking an image and storing it (Step 1101) and after a wait period determined in Step 1104. This is repeated until a specified number of images have been taken (YES in Step 1102) by comparing the counter number with the specified number of images to be taken. At this moment, images each taken under specified conditions (or all under fixed conditions, as in this example) are stored at specified areas of the image memory 103.

After the specified number of images have thus been taken in Step 1001, a preferred order in which the obtained images are decoded is determined (Step 1002), as will be explained in detail below and the order thus determined is stored in the general memory 102.

Thereafter, decoding processes are carried out on the obtained images according to specified rules as explained above in detail with reference to FIG. 8 (Step 1003) and the decoded results are individually stored (Step 1004). In Step 1004, success or failure of the decoding process for each image is stored in correlation with the order in which the corresponding image was taken. As explained above with reference to FIG. 6, stability and other image-taking conditions may also be stored additionally.

Next, it is determined for each of the images whether or not the decoding process has been successful (Step 1005). If it was successful (YES in Step 1005), its "success timing" (or the order in which this successfully decoded image was taken in the series of image-taking processes) is stored and the order of decoding for the next time is determined (Step 1006). The result of success is outputted thereafter (Step 1009) and the decoding step ends as a success.

In the case of an image for which the decoding process is determined not to have been successful (NO in Step 1005), it is checked to determine whether or not there are still other images on which the decoding process has not yet been carried out (Step 1006). If it is determined that there is no other image left (NO in Step 1006), the result of the failure is outputted (Step 1010) and the decoding process is terminated as a failure. If it is determined that there is at least one other image on which the decoding process is yet to be attempted (YES in Step 1006), a counter number representing the number of times the decoding process has been carried out is incremented by +1 (Step 1007) and Steps 1002, 1003, 1004 and 1005 are repeated.

Figure 12:
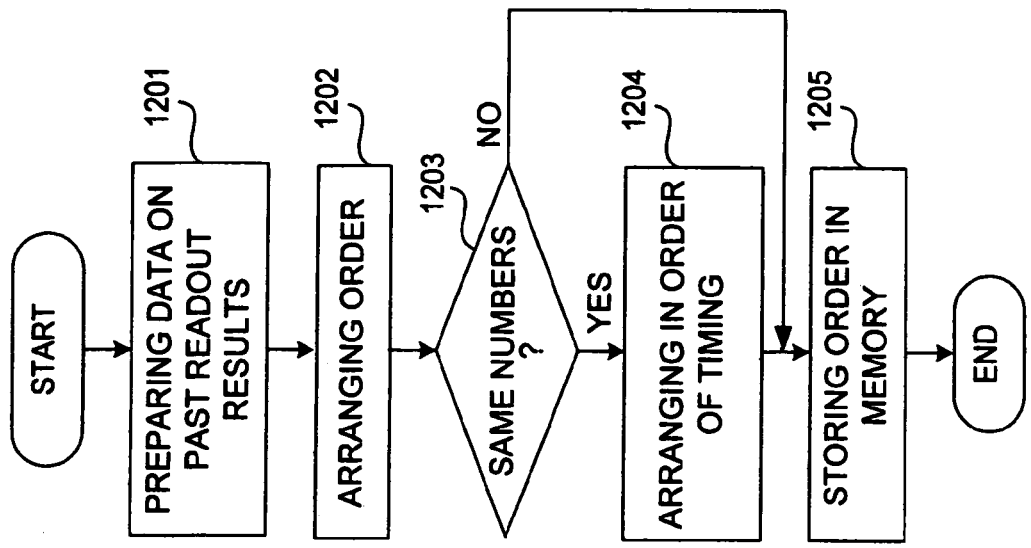
FIG. 12 is a flowchart of the process for determining the next decoding order.

The process for determining the order of decoding for the next time is shown by the flowchart of FIG. 12. In this process, data on the past readout results showing what was the order in which a successfully decoded image was taken are prepared for each of the series of image-taking processes in the past (Step 1201). This is essentially a history of orders in which successfully decoded images were taken. FIG. 13 is an example of a table showing such a history in a case showing the results of 100 past readout processes each on seven images. In other words, seven images were successively taken each time and this was repeated 100 times. The table shows that the decoding was first successful on the fifth of the seven images taken in the most recent one of the 100 past readout process (or the 100th readout), that it was also the fifth image that was first successfully decoded in the second most recent readout process (the 99th readout), the fourth image in the third most recent readout process (the 98th readout), the third image in the fourth most recent readout process (the 97th readout), and so forth. The farthest right-hand column of the table shows that in none of the past 100 readout processes the first image taken out of seven each time was successfully decoded. Similarly, it is shown that it was respectively zero, 1, 9, 85, 5 and zero of the past 100 readout processes in which the second, third, fourth, fifth, sixth and seventh image was the first successfully decoded image.

After a table of history is thus prepared, the order in which the image was taken ("image-taking order") is arranged in the order of frequency of successful decoding (Step 1202) and a decoding order is thereby determined. In the example of FIG. 13, the fifth image was most frequently decoded successfully, the fourth image was second most frequently decoded successfully, and so forth, such that the decoding order is determined as 5→4→6→3→1→2→7. In the case of orders having the same frequency number, they are arranged according to their image-taking orders (Steps 1203 and 1204). The order (sequence) thus determined is stored (Step 1205) and is used in Step 1202 when the decoding process is carried out next time.

If the order in which images taken in a sequence are decoded (or the "decoding order") is thus determined from a history table, the attempt to decode is started from the image presumably having the highest probability of being successfully decoded, and hence the time required for a successful decoding is most likely to be reduced from a statistical point of view. This is significant when, for example, a fixed camera is used to take in images of works that are being transported. If there is no variation among the positions of two-dimensional codes on the works, the timing of arrival of a trigger input and that of a two-dimensional code into the filed of vision of the camera should be approximately constant. Thus, if a plurality of images are sequentially taken continuously after the arrival of a trigger input, it should be predictable which of the sequentially taken images is most likely to include the image of the two-dimensional code. By thus carrying out the decoding process from the image most likely to include the image of the two-dimensional code, a successful decoding result should be obtained always in a shortest possible time.

When the decoding process according to the flowchart of FIG. 10 is found to be successful on any of the sequentially taken images, the decoding process is not carried out on the remaining images in the sequence and the successful result of the decoding is immediately outputted. This further serves to reduce the processing time while it is being made certain that a successful decoding result has been obtained. Moreover, since the order of decoding keeps being corrected according to the past history of the order of successfully decoded images, the processing time can be reduced even more dependably.

Figure 14:
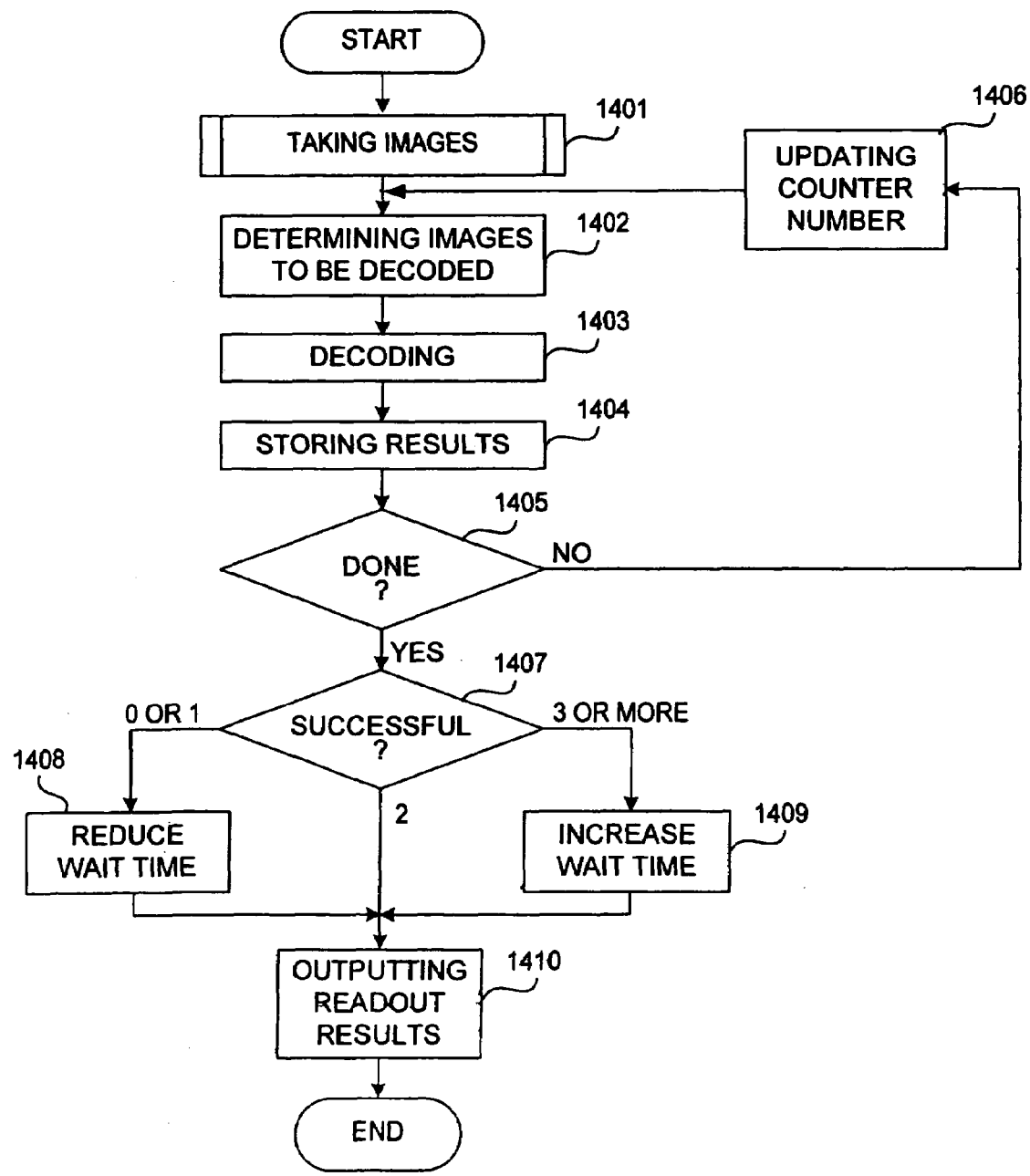
FIG. 14 is a flowchart of the entire process for reading two-dimensional codes (by automatically correcting the image-taking intervals).

FIG. 14 shows a flowchart of a process carried out in the RUN mode for reading out two-dimensional codes by automatically correcting the image-taking intervals. Step 1401 of this flowchart is the same as Step 1001 of FIG. 10 and is carried out as explained above with reference to FIG. 11. Step 1402 is similar to Step 1002 but the images to be decoded are obtained from the image memory 103 in a fixed order such as the same order in which the images were taken. Step 1403 is the same as Step 1003 and is carried out as explained above with reference to FIG. 8. Step 1404 is the same as Step 1004 and success or failure of the decoding process on the corresponding image is individually stored. Steps 1402, 1403 and 1404 are thereafter repeated, while a counter number representing the number of repetitions is incremented by +1 for each cycle (Step 1406) until the counter number indicates that the extraction of all decoded images has been completed (YES in Step 1405).

For each series of images taken continuously, it is examined next how many of them have been successfully decoded, and three situations "zero or 1", "2" and "3 or more" are considered (Step 1407). If the number determined in Step 1407 is "2", the readout results are immediately outputted (Step 1410) and this readout process is completed. If the number is "zero or 1", the wait time in the image-taking process (or the time intervals at which successive images are repeatedly taken) is reduced by one stage (Step 1408) and this is followed by Step 1410. If this number is "3 or more", the wait time is increased by one stage (Step 1409), followed by Step 1410.

Figure 15:
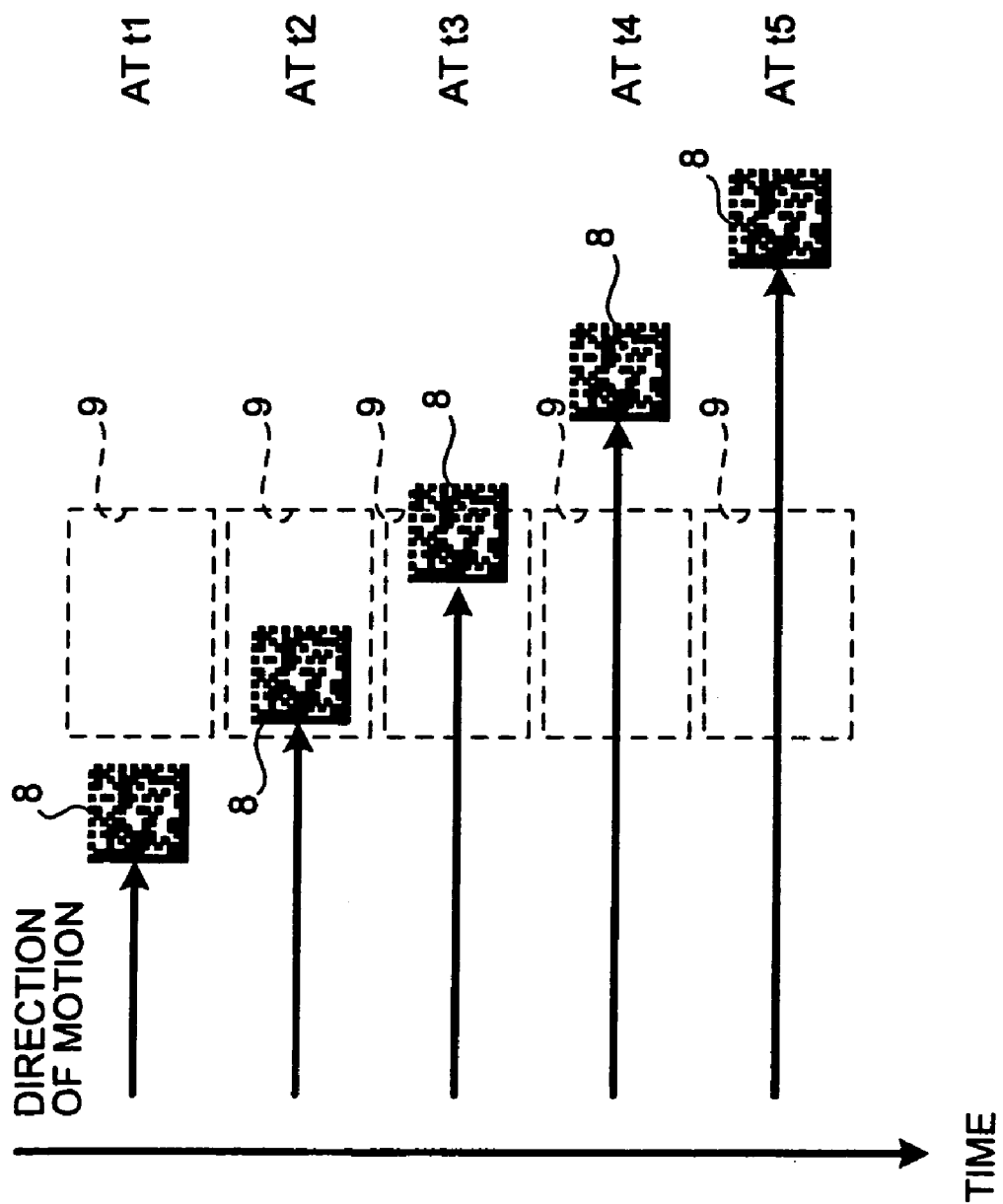
FIG. 15 is a drawing for showing the positional relationship between a two-dimensional code and the camera as the work is being transported.

In summary, a feedback control is carried out in this readout process of FIG. 14 such that the wait time is increased or decreased such that two of each series of images will contain a two-dimensional code. The merit of this control is explained next with reference to FIG. 15 which shows the positional relationship between a two-dimensional code 8 on a work and the field of vision 9 of the camera 2 as the work is transported from time t1 through times t2, t3 and t4 to time t5. At time t1, the two-dimensional code 8 on the work is about to enter but has not really entered the filed of vision 9 of the camera 2. At time t2, the two-dimensional code 8 has just entered and at the left-hand end of the field of vision 9 of the camera 2. At time t3, the two-dimensional code 8 is about to leave but is still inside and at the right-hand end of the field of vision 9 of the camera 2. At time t4, the two-dimensional code 8 has already left the field of vision 9 of the camera 2. At time t5, the two-dimensional code 8 is farther away. This means that only the images taken at times t2 and t3 contain the two-dimensional code 8. The images taken at times t1, t4 and t5 do not contain the code 8. If the wait time in the image-taking process is reduced, the number of images containing the two-dimensional code 8 may increase to 3 or more. If the wait time is increased, on the other hand, the number may be reduced to zero or 1.

If the total time for taking images successively is kept constant, the number of images taken will increase as the wait time is shortened and a memory of a larger capacity will be required, thereby increasing the production cost of the device. If the wait time is increased, the number of images containing the two-dimensional code will decrease and if a two-dimensional code is displaced on the work, there may be found no image containing the two-dimensional code. In order to be successful in the readout process, there must be at least one image containing the two-dimensional code 8 but if the wait time is adjusted such that there will be only one image containing the two-dimensional code 8, the decoding may fail if there are variations in the position of the two-dimensional code 8. This is why the wait time is adjusted in the feedback control according to this invention such that exactly two images are likely to contain the two-dimensional code 8 because at least one of the images will contain the two-dimensional code 8 even if there are variations in the position of the two-dimensional code 8. This control may be carried out not only in the RUN mode but also in the SET mode.

Figure 16:
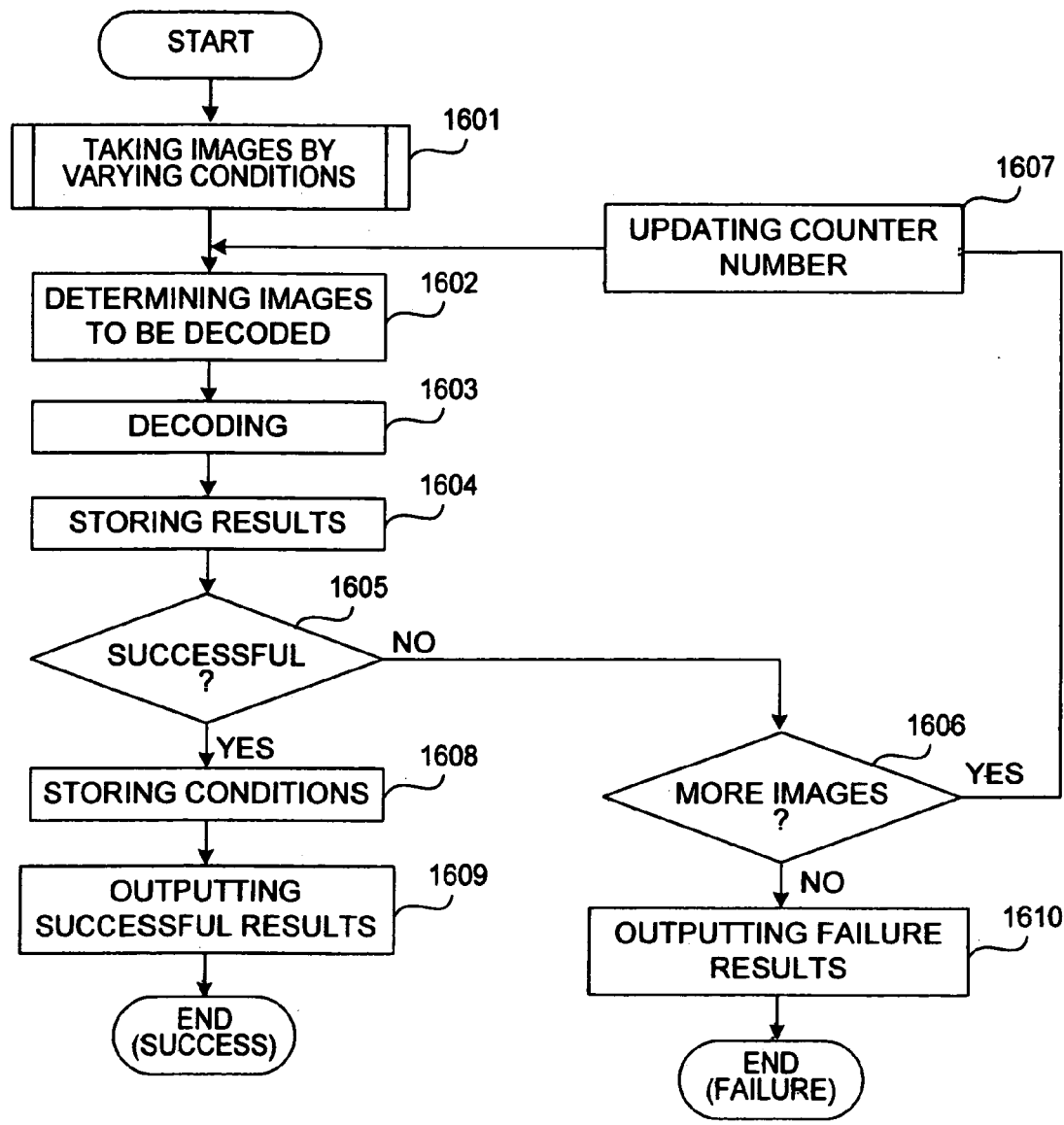
FIG. 16 is a flowchart of the entire process for reading two-dimensional codes (by obtaining a plurality of images under different conditions).
Figure 19A:
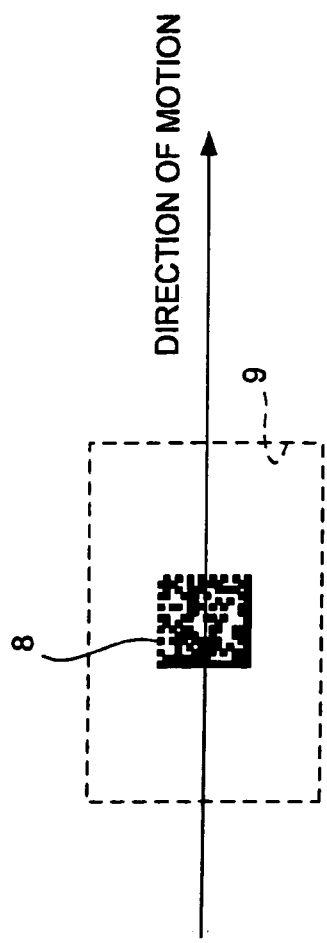
FIGS. 19A and 19B, together referred to as FIG. 19, are schematic drawings for showing how a problem may occur at the time of reading a two-dimensional code on a moving work.
Figure 19B:
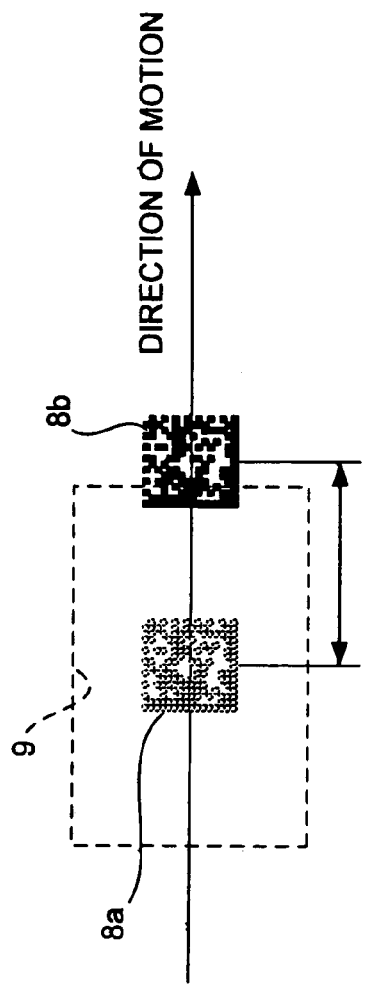

FIG. 16 shows a flowchart of a process carried out in the RUN mode for reading two-dimensional codes by taking a plurality of images under different conditions. Firstly in this process, a specified plural number of images are taken by changing image-taking conditions each time (Step 1601). Details of Step 1601 are shown in FIG. 17.

As shown in FIG. 17, new image-taking conditions such as the shutter speed and the lighting conditions are set (Step 1701) for each of the specified plurality number of images to be taken. After an image is taken, the obtained image is stored in the image memory (Step 1702) and Steps 1701 and 1702 are repeated with a specified wait time after each cycle (Step 1705) for the specified number of times by increasing a counter number by +1 after each cycle (Step 1704) in a known manner and comparing this counter number with the specified number (Step 1703).

Examples of lighting pattern (lighting condition) are shown in FIG. 18 for the nine illuminator elements 751, 711-714 and 721-724 shown in FIG. 9. FIG. 18A shows a first pattern wherein all nine illuminator elements are lit. FIG. 18B shows a second pattern wherein all but the center illuminator element 751 are lit. FIG. 18C shows a third pattern wherein only the four outer illuminator elements 721-724 are lit. FIG. 18D shows a fourth pattern wherein only the four inner illuminator elements 711-714 are lit. FIG. 18E shows a fifth pattern wherein only the center illuminator element 751 is lit. Thus, as explained above, five lighting patterns may be presented by selectively switching on and off the nine illuminator elements. In Step 1701, the image-taking conditions may be changed by switching from one to another of these patterns.

After Step 1601 is completed, Steps 1602, 1603 and 1604 are sequentially carried out, as Steps 1002, 1003 and 1004 are carried out, and it is determined whether or not the decoding process has been successful for each image (Step 1605).

If it is determined that the decoding was successful (YES in Step 1605), the image-taking conditions (shutter speed and lighting conditions) that brought about the success are stored (Step 1608) and the result of the readout process is outputted (Step 1609). In the case of an image for which the decoding is determined not to have been successful (NO in Step 1605), it is checked to determine whether or not there are still other images on which the decoding process has yet to be carried out (Step 1606). If it is determined that there is no other image left (NO in Step 1606), the result of the failure is outputted (Step 1610) and the decoding process is terminated as a failure. If it is determined that there is at least one other image on which the decoding process is yet to be attempted (YES in Step 1606), a counter number representing the number of times the decoding process has been carried out is incremented by +1 (Step 1607) and Steps 1602, 1603 and 1604 are repeated.

By this readout process explained with reference to FIG. 16, each of the plurality of images that are decoded is taken under different image-taking conditions. Thus, even in situations where the surface characteristics (such as smoothness, roughness, lightness, darkness, presence and absence of designs) of the work, on which the two-dimensional code is attached, may vary, the probability of successful decoding can be increased since images are taken under different conditions.

The readout process described above is effective not only on works that are being transported but also on stationary works especially where the image-taking conditions are unstable, say, because of the effects of disturbance due to external light. In the case of a system having a specified readout position, causing each work to be removed therefrom after a decoding process is completed and bringing in another work to this readout position, furthermore, the routine for automatically correcting the order of decoding according to this invention allows the movements of the works and the readout process to be carried out at the timing of the judgment of successful decoding and hence the wait time until the readout process on the next work can be shortened.

Where there are variations in the surface conditions of the works, the method of this invention for automatically setting conditions for taking a plurality of images allows to improve the reliability of readout. By automatically correcting the order of decoding and setting image-taking conditions at the same time, not only can the readout be carried out reliably even where the surface conditions of the work may change but also the wait time until the readout process on the next work can be shortened.

In summary, a plurality of images are taken under specified conditions in response to a specified command signal and the obtained images are decoded in a specified order. If the decoding is successful on at least one of the images, the decoding process is deemed successful and the result is outputted. Thus, even in the presence of variations in the timing between the trigger input and the arrival of the work or variations in optical conditions on the works, the probability of at least one of the sequentially taken images containing the optical code is increased and hence that the probability of successfully reading out the optical code is improved.

What is claimed is:

1. A device for reading out an optical code, said device comprising:
    a camera;
    an image memory for storing images taken by said camera;
    an image processor for decoding an optical code contained in an image taken by said camera;
    image-taking means for obtaining a plurality of images continuously with said camera under specified image-taking conditions in response to a specified image-taking command and causing the obtained images to be stored on said image memory;
    image-decoding means for sequentially selecting one of the images stored on said image memory in a specified order, causing said image processor to make an attempt to decode an optical code contained in the selected image, and outputting results of decoding as successful decoding, if the attempt to decode at least one of the stored images is successful; and
    interval-changing means for changing interval at which the plurality of images are to be taken by said image-taking means according to the number of successfully decoded ones of the plurality of images taken continuously in the past, said interval-changing means serving to change the intervals according to the number of images taken continuously by said image-taking means while keeping constant the total time taken for taking said plurality of images continuously by said image-taking means.

* * * * *